INVENTOR.
ALBERT ZUPAN
ATTORNEY

United States Patent Office 3,211,865
Patented Oct. 12, 1965

3,211,865
THERMAL LIQUID LEVEL CONTROL SWITCH
Albert Zupan, 423 Forest Ave., Fairfax, Va.
Filed Sept. 17, 1963, Ser. No. 309,578
4 Claims. (Cl. 200—140)
(Granted under Title 35, U.S. Code (1952), sec. 266)

The invention described herein may be manufactured and used by or for the Government for governmental purposes without the payment to me of any royalty thereon.

This invention relates to a liquid level control switch which is also responsive to temperature changes. This switch has particular use where conditions dictate that a minimum liquid level and a maximum temperature level be simultaneously and independently controlled.

The main object of this invention is to provide a switch that is simple in design and responsive to either liquid level or temperature.

Another object of this invention is to provide a switch that will close or open an electrical contact when either the temperature rises above a particular level or the liquid level drops below a designated point.

Figure 1:
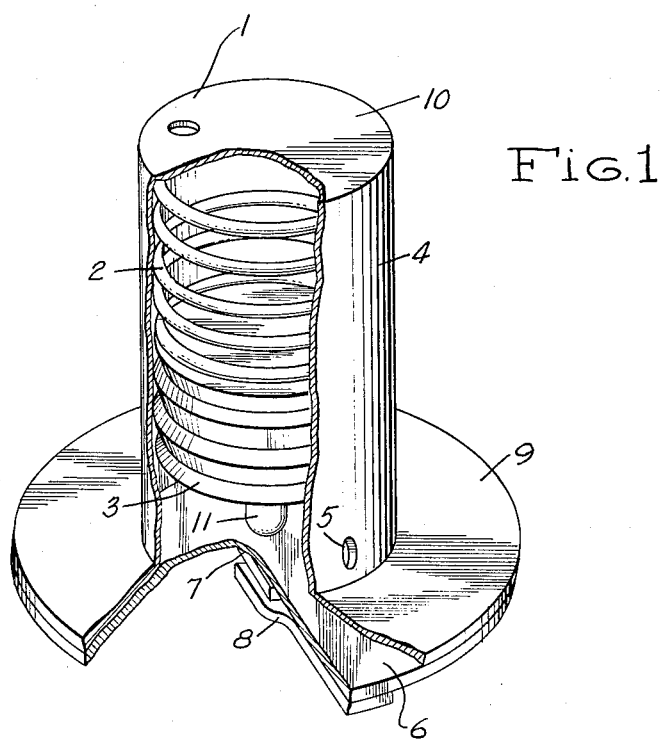
Figure 2:
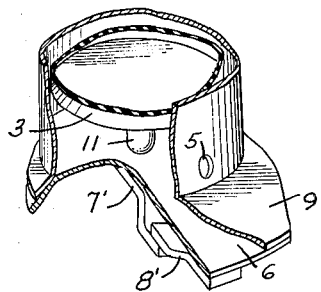

FIG. 1 is a perspective cutaway view, partly in section, of the thermal liquid level control switch; and FIG. 2 is a partial perspective cutaway view of the lower portion of FIG. 1 with differently arranged contacts.

In some instances it is desirable to have a control responsive to either temperature changes or liquid level changes. One example is in an engine crankcase. Here, the oil level must be maintained at a minimum level and also the temperature must not rise above a certain point. One way of controlling these two conditions is with a separate control for each condition, i.e., temperature and liquid level, but as will be pointed out in a more detailed description of the invention, the present device combines both of these controls in a simple reliable control.

The switch of this invention can be used for a variety of switching operations where normally open and normally closed switch contacts may be required to simultaneously or independently control liquid levels and temperatures of liquids.

The switch illustrated in FIG. 1 is comprised of a cylindrical housing 4 having an upper vent 1 and a lower vent 5 through which the liquid can enter and exit. Housing 4 has top member 10 at one end and flange 9 at the lower or opposite end. Across flange 9 is fixed a flexible diaphragm 6 which is sealed in a water tight connection to flange 9. Mounted in the center and on the outside of the flexible diaphragm 6 is a movable electrical contact 7 which cooperates with a fixed electrical contact 8 secured through the diaphragm to flange 9. Any movement downward of diaphragm 6 will cause contacts 7 and 8 to contact and complete a circuit.

Interior of the cylindrical housing 4 is a float member 3 having attached to the bottom of it a prod 11. Between the top of float 3 and top member 10 of housing 4 is spring 2. This spring acts to hold down float member 3 against the liquid level within the chamber 4, and as the level rises the float pushes against spring 2 and rises thereby elevating prod 11 away from diaphragm. When the level of liquid in the chamber drops below a certain point the spring pushes the float 3 downward and prod 11 contacts diaphragm 6 forcing movable contact 7 against fixed contact 8. If the temperature rises above a predetermined level the bellows-type float 3 will expand and also force prod 11 down against flexible diaphragm 6 closing contacts 7 and 8. It will be noted that the switch contacts 7 and 8 are closed either when the liquid level drops and the bellows float 3 loses its buoyant resistance to spring 2 or when the temperature rises and the bellows float 3 expands and creates an expanding force between the spring 2 and diaphragm 6.

The structure of FIG. 2 is similar to that of FIG. 1 except that upon movement downward of the diaphragm 6 by prod 11, switch contacts 7' and 8' are opened. The operation and coaction of the thermostat bellows 3 and the spring 2 of FIG. 2 upon change of liquid level or temperature rise is the same as that described with reference to FIG. 1.

One of the main advantages of this thermal liquid level control switch is that it is responsive to both temperature rise and liquid level drop. Flange 9 also acts as a boundary allowing the entire cylinder 4 to be placed inside a liquid container and allowing the electrical contacts 7 and 8 to be outside the liquid containing vessel.

I claim:

1. A control switch responsive to predetermined liquid levels and temperature limits comprising:
   a. a cylindrical housing closed at one end and having an external flange at an opposite open end thereof;
   b. vent means for said cylindrical housing;
   c. diaphragm means secured to said flange and closing the open end of said cylindrical housing, said diaphragm having a flexible portion communicating with the open end of said cylindrical housing;
   d. electrical contact means including a fixed and movable element each carried by said diaphragm, said movable element secured to said flexible portion of said diaphragm;
   e. temperature responsive float means within said cylindrical housing and resilient means at an end adjacent the closed end of said cylindrical housing in contact with said float urging said float toward said diaphragm whereby liquid levels and temperature in excess of predetermined limits simultaneously and independently act on said float to exert pressure upon said flexible portion of said diaphragm to displace said movable element to selectively open and close said electrical contact means.

2. A control switch responsive to predetermined liquid levels and temperature limits comprising:
   a. a cylindrical housing closed at one end and having an external flange at its opposite open end;
   b. vent means for said cylindrical housing;
   c. diaphragm means closing the open end of said cylindrical housing including a central movable portion and an outer fixed portion, said diaphragm being secured at the outer fixed portion to said external flange;
   d. electrical contact means having a first element thereof secured to said central movable portion of said diaphragm and a second element thereof overlapping a portion of said first element and secured to the outer fixed portion of said diaphragm, said first and second elements being mutually spaced at overlapping portions thereof; and
   e. bellows-type float means responsive to temperature and liquid levels within said cylindrical housing and resilient means at an end adjacent the closed end of said cylindrical housing in contact with said float urging said float toward said diaphragm whereby liquid levels and temperature in excess of predetermined limits simultaneously and independently act on said float to exert pressure on said flexible portion of said diaphragm to displace said first element to selectively open and close said electrical contact means.

3. A control switch as claimed in claim 1 wherein said float has a prod member fixed to the end adjacent said diaphragm, said prod contacting said flexible diaphragm directly above said movable electrical contact means.

4. A control switch responsive to predetermined liquid levels and temperature limits comprising:
   a. a housing closed at one end and opened at the opposite end, said housing having a vent means;
   b. a base member at the open end of said housing comprising a rigid portion secured to said housing and a flexible diaphragm means secured to said rigid portion, said flexible diaphragm means communicating with and covering the open end of said housing;
   c. an electrical contact means including a fixed and a movable element each carried by said base member, said movable element secured to said flexible diaphragm means, said fixed element secured to said rigid portion thereof; and
   d. a temperature responsive float means within said housing, and resilient means at an end adjacent the closed end of said housing in contact with said float urging said float toward said diaphragm whereby liquid levels and temperature in excess of predetermined limits simultaneously and independently act on said float to exert pressure upon said flexible diaphragm means to displace said movable element to selectively open and close said electrical contact means.

References Cited by the Examiner

UNITED STATES PATENTS

| 1,962,587 | 6/34 | Getchell. | |
| 2,006,608 | 7/35 | Smulski | 177—351 |
| 2,113,499 | 4/38 | Shoemaker | 236—63 |
| 2,494,925 | 1/50 | Appelberg | 177—311 |
| 2,551,793 | 5/51 | De Giers et al. | 73—313 |
| 2,586,449 | 2/52 | Whitten | 200—84 |

BERNARD A. GILHEANY, *Primary Examiner.*